United States Patent Office 3,228,931
Patented Jan. 11, 1966

---

3,228,931
19-NOR DERIVATIVES OF 16,17-DIHYDROXY-PROGESTERONE
Patrick Andrew Diassi, Westfield, N.J., assignor to Olin Mathieson Chemical Corporation, New York, N.Y., a corporation of Virginia
No Drawing. Filed Oct. 24, 1963, Ser. No. 318,503
11 Claims. (Cl. 260—239.55)

This invention relates to and has for its objects the provision of new physiologically active compounds, novel processes for their production and new intermediates useful in the preparation thereof.

More particularly, this invention relates to compounds of the formula:

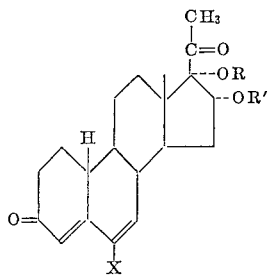

wherein X is selected from the group consisting of hydrogen and halogen (e.g. chloro or bromo). R is hydrogen; R' is hydrogen and taken together R and R' is

wherein P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is a monocyclic cycloalkyl or monocyclic heterocyclic radical.

The final products of this invention are physiologically-active substances which possess progestational activity and hence can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered perorally in the form of tablets. Moreover, it has surprisingly been found that the compounds of this invention are many times more active than are the corresponding 19-methylated derivatives.

The compounds of this invention can be prepared by employing the novel processes of this invention beginning with compounds of the formula.

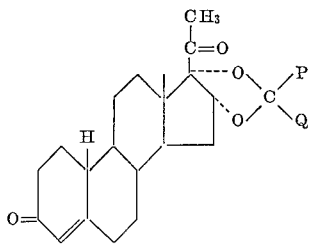

wherein P and Q are as hereinbefore defined, as starting material. The starting material of this invention may be prepared in accordance with the procedures set forth in copending application, Serial No. 129,234, filed August 4, 1961, in the names of Josef Fried and Mariano Guiducci.

The compounds of this invention may be prepared according to the process of this invention which may be represented by the following equations wherein R, R', P, Q and X are as hereinbefore defined; and Z is lower alkyl:

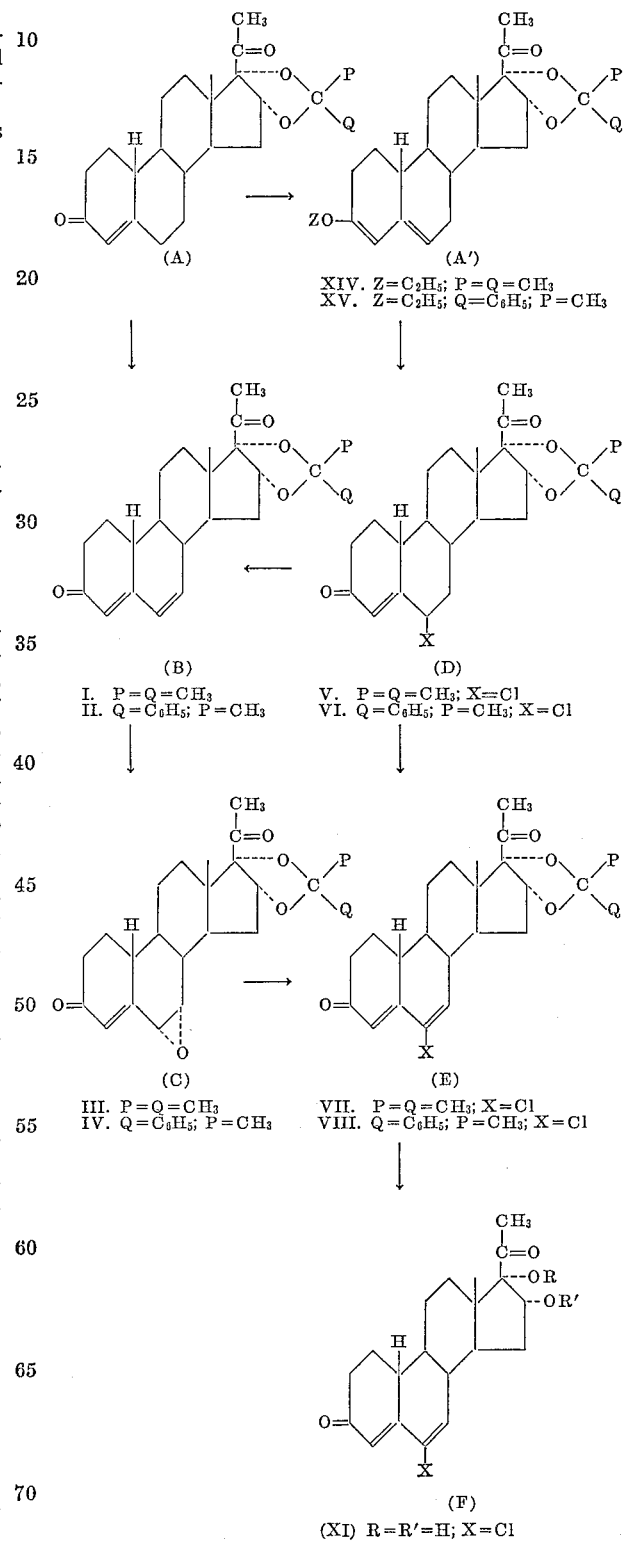

In the first step of the process of this invention, the 16,17-acetal and ketal derivatives of 16,17-dihydroxy-19-norprogesterone are alkylated, as by treatment with an alkyl orthoformate, for example, ethyl orthoformate to yield the 16,17-acetal and ketal derivatives of 3-alkoxy-19-nor-$\Delta^{3,5}$-pregnadiene-20-one (Compounds A') which are new compounds of this invention.

Compounds A' may then be halogenated as by treatment with a halosuccinimide, to yield the 6-halo derivatives of the 16,17-acetals and ketals of 19-norprogesterone (Compounds D), which are also new compounds of this invention. Compounds D may then be dehalohydrogenated as by treatment with a base, such as collidine, and a strong acid, e.g. hydrogchloric acid, to yield the 16,17-acetals and ketals of 19-nor-$\Delta^{4,6}$-pregnadiene-3,20-diones, (Compounds B), which are also new compounds of this invention. Alternatively, Compounds D may be treated directly, as with chloranil, to yield the 6-halo derivatives of the 16,17-acetals and ketals of 19-nor-$\Delta^{4,6}$-pregnadiene-3,20-dione (Compounds E; wherein X is halo), which are new products of this invention.

Alternatively, Compounds A are first dehydrognated as by treatment with 2,3-dichloro-5,6-dicyanobenzoquinone and hydrogen chloride, to yield the 16,17-acetals and ketals of 19-nor-$\Delta^{46}$-pregnadiene-20-one (Compounds B). Compounds B may then be epimerized as by treatment with a peracid, for example, perbonzoic acid, to yield the 16,17-acetals and ketals of 6,7-epoxy-19-norprogresterone (Compounds C), which are also new compounds of this invention. The 6,7-epoxy compounds (Compounds C) are then hydrohalogenated as by treatment with hydrogen chloride to yield the 16,17-acetals and ketals of 6-halo-19-nor-$\Delta^{4,6}$-pregnadiene-3,20-one (Compounds E) which are new products of this invention. Compounds E may be cleaved as by treatment with formic acid to yield 6-halo-16,17-dihydroxy-19-nor-$\Delta^{4,6}$-pregnadiene-3,20-dione (Compounds F), which are also new compounds of this invention.

To obtain any desired 16,17-ketal or acetal derivative of this invention, Compounds F may then be treated with an aldehyde or ketone of the formula

wherein P and Q are as hereinbefore defined. The reaction is preferably carried out by treating a suspension or solution of the dihydroxy steroid in the aldehyde or ketone (or an organic solvent and the aldehyde or ketone, if the aldehyde or ketone is a solid) with an acid catalyst (e.g., perchloric acid p-toluenesulfonic acid, hydrochloric acid, and so forth), neutralizing the acid and recovering the acetal or ketal derivative formed.

Suitable aldehyde and ketone reactants include lower alkanals of at least two carbon atoms, such as paraldehyde, propanal and hexanal; di(lower alkyl)-ketones, such as acetone, diethylketone, dibutylketone, methylethylketone, and methylisobutylketone; cycloalkanones, such as cyclobutanone, cyclopentanone, cyclohexanone suberone, and cyclodexanone; cycloalkyl (lower alkanals), such as cyclopropylcarboxaldehyde, cyclobutylcarboxaldehyde, cyclopentylcarboxaldehyde, cyclohexylcarboxaldehyde, cycloheptylcarboxaldehyde, cyclooctylcarboxaldehyde, cyclopropylacetaldehyde, cyclobutylacetaldehyde, cyclopentylacetaldehyde, cyclohexylacetaldehyde, $\beta$-cyclopentylpropionaldehyde, $\gamma$ - cyclohexylbutylaldehyde and 3-cyclopropylcaproaldehyde; cycloalkyl(lower alkanones), such as cyclopropyl methyl ketone, cyclobutyl ethyl ketone, cyclopentyl propyl ketone, cyclopentylmethyl methyl ketone, cyclohexylmethyl ethyl ketone, cyclopentylethyl ethyl ketone, cyclopropylpropyl methyl ketone, cyclohexyl n-pentyl ketone, cyclohexyl methyl ketone, and cyclooctyl methyl ketone; dicycloalkyl ketones, such as dicyclopropyl ketone, dicyclobutyl ketone, dicyclopentyl ketone, dicyclohexyl ketone, cyclopentyl cyclohexyl ketone cyclopropylmethyl cyclopropyl ketone, 2-cyclobutylethyl cyclopropyl ketone, 3-cyclopentylmethyl cyclopentyl ketone, 5-cyclohexylhexyl cyclohexyl ketone, di(cyclopentylmethyl) ketone, cyclohexylmethyl cyclopentyl ketone, and di(4-cyclohexylpentyl) ketone; cycloalkylmonocyclic aromatic ketones, such as cyclopropyl phenyl ketone, cyclohexyl p-chlorophenyl ketone, cyclopentyl o-methoxyphenyl ketone, cyclopentyl o,p-dihydroxyphenyl ketone, cyclohexyl m-tolyl ketone, cyclopropyl p-ethylphenyl ketone cyclopropyl p-nitrophenyl ketone, and cyclohexyl p-acetamidophenyl ketone; cycloalkyl(lower alkyl) monocyclic aromatic ketones, such as cyclopenylmethyl phenyl ketone; cycloalkyl monocyclic aromatic (lower alkyl) ketones, such as cyclopentyl benzyl ketone, cyclohexyl phenethyl ketone, and cyclobutyl benzyl ketone; cycloalkyl (lower alkyl) monocyclic aromatic (lower alkyl) ketones such as cyclopentylmethyl benzyl ketones; cycloalkyl monocyclic heterocyclic ketones, such as cyclopentyl 2-furyl ketone, cyclohexyl 2-thienyl ketone, and cyclopropyl 2-pyridinyl ketone; cycloalkyl (lower alkyl) monocyclic heterocyclic ketones, such as cyclopentylmethyl 2-piperidinyl ketone, cyclohexylethyl 2-morpholinyl ketone and cyclopropyl 2-thienyl ketone; cycloalkyl monocyclic heterocyclic (lower alkyl) ketones, such as cyclopentyl thenyl ketone, cyclohexyl furfuryl ketone and cyclopropyl 2-piperidinylmethyl ketone; halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halo-benzaldehydes (e.g. p-chlorobenzaldehyde and p-fluorobenzaldehyde), lower alkoxybenzaldehydes (e.g. o-anisaldehyde), di(lower alkoxy) benzaldehydes (e.g. veratraldehyde), hydroxybenzaldehydes (e.g. salicylaldehyde), dihydroxybenzaldehydes (e.g. resorcyaldehyde), lower alkyl benzaldehydes (e.g. m-tolualdehyde and p-ethylbenzaldehyde), di(lower alkyl)-benzaldehydes (e.g. o,p-dimethylbenzaldehyde), nitrobenzaldehydes, acylamidobenzaldehydes (e.g. N-acetylanthranilaldehyde), and cyanobenzaldehydes; monocyclic carboxylic aromatic lower alkanals, such as phenylacetaldehyde, $\alpha$-phenylpropionaldehyde, $\beta$-phenylpropionaldehyde, $\gamma$-phenylbutyraldehyde, and aromatically-substituted halo lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; monocyclic carbocylic aromatic ketones, such as acetophenone, $\alpha,\alpha,\alpha$-trifluoroacetophenone, propiophenone, butyrophenone, valerophenone, isocaprophenone, halophenyl lower alkyl ketones (e.g. p-chloroacetophenone and p-chloropropiophenone), (lower alkoxy) phenyl lower alkyl ketones (e.g. p-anisyl methyl ketone), di(lower alkoxy)phenyl lower alkyl ketones, hydroxy-phenyl lower alkyl ketones, dihydroxyphenyl lower alkyl ketones (e.g. resacetophenone), (lower alkyl) phenyl lower alkyl ketones (e.g. methyl p-tolyl ketone), di(lower alkyl)-phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoylfuran, 2-acetyl-thiophene and alloxan; and monocyclic heterocyclic lower alkanones.

The following examples are illustrative of the invention (all temperatures being in degrees centigrade unless specifically noted).

EXAMPLE 1

*3-ethoxy-16α,17α-dimethylmethylenedioxy-19-nor-Δ³,⁵-pregnadiene-20-one (XIV)*

To a suspension of 5 gm. of 16α,17α-dimethylmethylenedioxy-19-nor-progesterone in a mixture of 38 ml. of dioxane, 0.5 ml. of absolute ethanol and 5 ml. of ethyl orthoformate, 3.5 ml. of a dioxane solution containing 0.18 ml. of sulfuric acid are added. The mixture is stirred for twenty minutes at room temperature then 2 ml. of pyridine are added and the mixture diluted with 30 ml. of water. The precipitate which separates is filtered, washed with methanol-water (1:1) and dried to give 3-ethoxy-16α,17α - dimethylmethylenedioxy-19 - nor-Δ³,⁵-pregnadiene-20-one.

EXAMPLE 2

*3-ethoxy-16α,17α-(β-methyl-α-phenylmethylenedioxy)-19-nor-Δ³,⁵-pregnadiene-20-one (XV)*

Following the procedure of Example 1 but substituting 16α,17α - (β-methyl-α-phenylmethylenedioxy)-19 - nor-progesterone for 16α,17α-dimethylmethylenedioxy-19-nor-progesterone there is obtained 3-ethoxy-16α,17α-(β-methyl-α - phenylmethylene - dioxy)-19-nor-Δ³,⁵-pregnadiene-20-one.

EXAMPLE 3

*6β-chloro-16α,17α-dimethylmethylenedioxy-19-nor-progesterone (V)*

To a stirred suspension of 300 mg. of 3-ethoxy-16α,17α-dimethylmethylendioxy-19 - nor-Δ³,⁵-pregnadiene-20-one in 10 ml. of dioxane a solution of 94 mg. of N-chlorosuccinimide in 2 ml. of dioxane are added, followed by 4 ml. of a buffer containing 6.6 gm. of sodium acetate and 6.6 ml. of acetic acid per 100 ml. of solution. The mixture is stirred at room temperature for forty-five minutes and then water is added slowly to give crystals which are filtered, washed with water and dried. Recrystallization from acetone-hexane gixes 6β-chloro-16α,17α-dimethylmethylenedioxy-19-nor-progesterone.

EXAMPLE 4

*6β-chloro-16α,17α-(β-methyl-α-phenylmethylenedioxy)-19-nor-progesterone (VI)*

Following the procedure of Example 3 but substituting 3-ethoxy 16α,17α-(β-methyl-α-phenylmethylenedioxy)-19-nor-Δ³,⁵-pregnadiene-20-one for 3-ethoxy-16α,17α-dimethylenedioxy-19-nor-Δ³,⁵-pregnadiene - 20 - one there is obtained 6β-chloro-16α,17α-(β-methyl-α - phenylmethylenedioxy)-19-nor-progesterone.

EXAMPLE 5

By substituting N-bromosuccinimide for the N-chlorosuccinimide in procedures of Examples 3 and 4 there are obtained 6β-bromo-16α,17α-dimethylmethylenedioxy - 19-nor-progesterone and 16β-bromo-16α,17α-(β - methyl-α-phenylmethylenedioxy)-19-nor-progesterone, respectively.

EXAMPLE 6

*16α-17α-dimethylmethylenedioxy-19-nor-Δ⁴,⁶-pregnadiene-3,20-dione (I)*

To a solution containing 100 mg. of 16α,17α-dimethylmethylenedioxy-19-nor-progesterone and 67.6 mg. of 2,3-dichloro-5,6-dicyanobenzoquinone in 6 ml. of dioxane a stream of HCl gas is introduced for thirty seconds.

The mixture is allowed to remain at room temperature for two hours during which time crystals at 2,3-dichloro-5,6-dicyanohydroquinone separate. These are filtered and washed with dioxane. The combined filtrate and washings are evaporated to dryness and the residue chromatographed on a plate of Woelm neutral alumina (activity V). Development of the plate with 40% chloroform-60% hexane, and elution of the UV detectable band of $R_f$ 0.6 gives, on crystallization of the residue, 36 mg. of 16α,17α-dimethylmethylenedioxy-19-nor - Δ⁴,⁶ - pregnadiene-3,20-dione having melting point 210–212°, $$\lambda_{max.}^{ethanol}\ 282\ m\mu\ (\epsilon=21{,}000)$$

EXAMPLE 7

*16α,17α-dimethylmethylenedioxy-19-nor-Δ⁴,⁶-pregnadiene-3,20-dione*

A solution of 100 mg. of 6β-bromo-16α,17α-dimethylmethylene-dioxy-19-nor-progesterone in 5 cc. of collidine is refluxed for forty-five minutes. The mixture is filtered and the filtrate acidified with 6 N hydrochloric acid and extracted with chloroform. The chloroform is washed again with dilute hydrochloric acid, then water, followed by 5% sodium bicarbonate and water again until neutral. The organic phase is then dried over magnesium sulfate and evaporated to dryness. Crystallization of the residue gives 16α,17α-dimethylmethylenedioxy-19-nor-Δ⁴,⁶ - pregnadiene-3,20-dione.

EXAMPLE 8

*16α-17α-(β-methyl-α-phenylmethylenedioxy-19-nor-Δ⁴,⁶-pregnadiene-3,20-dione (II)*

Following the procedure of Example 6 but substituting 16α,17α-(β-methyl-α - phenylmethylenedioxy) - 19 - nor-progesterone for 16α,17α - dimethylmethylenedioxy - 19-nor-progesterone there is obtained 16α,17α-(β-methyl-α-phenylmethylenedioxy)-19-nor-Δ⁴,⁶ - pregnadiene - 3,20-dione having melting point 150–151° $[\alpha]_D^{22}+68.6$ (chloroform), $$\lambda_{max.}^{alcohol}\ 283\ m\mu\ (\epsilon=25{,}000)$$

*Analysis.*—Calc'd for $C_{28}H_{32}O_4$ (432.54): C, 77.75; H, 7.46. Found: C, 77.79; H, 7.47.

EXAMPLE 9

*16α,17α-(β-methyl-α-phenylmethylenedioxy)-19-nor-Δ⁴,⁶-pregnadiene-3,20-dione*

Following the procedure of Example 7 but substituting 6β-bromo-16α,17β(β-methyl - α - phenylmethylenedioxy)-19-nor-progesterone for 6β-bromo - 16α,17α - dimethylmethylenedioxy-19-nor - progesterone there is obtained 16α,17α-(β-methyl-α - phenylmethylenedioxy) - 19 - nor-Δ⁴,⁶-pregnadiene-3,20-dione.

EXAMPLE 10

*6α,7α-oxido-16α,17α-dimethylmethylenedioxy-19-nor-progesterone (III)*

To a solution of 93 mg. of 16α,17α-dimethylmethylenedioxy-19-nor-Δ⁴,⁶-pregnadiene-3,20-dione in 12.5 ml. of methylene chloride cooled to 0° C. there is added 225 ml. of meta-chloroperbenzoic acid.

The resulting solution is allowed to remain at room temperature for forty hours and then is diluted with 15 ml. of methylene chloride, washed with 5% sodium sulfite, followed by 5% sodium bicarbonate and then with water. The methylene chloride is evaporated in vacuo and the residue plate chromatographed on Woelm neutral alumina (activity V): the developing solvent being chloroform. Solution of the band detectable by an UV at $R_f$ 0.3 and crystallization of the residue obtained by elution with ethyl acetate gives 6α,7α-oxido-16α,17α-dimethyl methylenedioxy-19-nor-progesterone having melting point 230–232°, $$\lambda_{max.}^{EtOH}\ 242\ m\mu\ (\epsilon=16{,}600)$$

*Analysis.*—Calc'd for $C_{23}H_{30}O_5$ (386.47): C, 71.48; H, 7.82. Found: C, 71.56; H, 7.94.

EXAMPLE 11

*6-chloro-16α,17α-dimethylmethylenedioxy-19-nor-Δ⁴,⁶-pregnadiene-3,20-dione (VII)*

A solution of 25 mg. of 6α,7α-oxido-16α,17α-dimethylmethylenedioxy-19-nor-progesterone in 4 ml. of a chloroform solution containing 11.5 mg. of hydrogen chloride per ml. is allowed to remain at room temperature for sixty minutes. It is then diluted with chloroform, washed with water followed by 5% sodium bicarbonate solution and then again with water until neutral. The chloroform is separated and evaporated to dryness in vacuo. The residue on purification by plate chromatography using florosil as absorbent and 20% ethyl acetate, 80% chloroform as the developing solvent gives a band at $R_f=0.4$ detectable by UV and eluted with ethyl acetate and which, on crystallization, gives 18 mg. of 6-chloro-16α,17α-dimethylmethylenedioxy-19-nor - $\Delta^{4,6}$ - pregnadiene - 3,20-dione having melting point 205–207°, $$\lambda_{max.}^{Ethanol}\ 284\ m\mu\ (\epsilon=21{,}000)$$

EXAMPLE 12

*6-chloro-16α,17α-dimethylmethylenedioxy-19-nor-$\Delta^{4,6}$-pregnadiene-3,20-dione*

To a solution of 400 mg. of 6β-chloro-16α,17α-dimethylmethylenedioxy-19-nor-progesterone in 28 ml. of tertiary butanol is added 728 mg. of chloranil and the mixture refluxed for twenty-seven hours. After cooling the undissolved chloranil is filtered and the filtrate evaporated to dryness in vacuo. The residue is dissolved in 40 ml. of ether, washed with water until the aqueous phase is colorless, the 4 x 50 ml. portions of 5% sodium hydroxide, followed by water until neutral, then dried over sodium sulfate, filtered and evaporated to dryness in vacuo. Purification of the residue by chromatography on Woelm neutral alumina gives 6-chloro-16α,17α-dimethylmethylenedioxy - 19 - nor - $\Delta^{4,6}$ - pregnadiene-3,20-dione.

EXAMPLE 13

*6-bromo-16α,17α-dimethylmethylenedioxy-19-nor-$\Delta^{4,6}$-pregnadiene-3,20-dione*

Following the procedure of Example 11 but substituting hydrogen bromide in acetic aid for the hydrogen chloride in chloroform solution there is obtained 6-bromo-16α,17α-dimethylmethylenedioxy - 19 - nor - $\Delta^{4,6}$ - pregnadiene-3,20-dione.

EXAMPLE 14

*6-bromo-16α,17α-dimethylmethylenedioxy-19-nor-$\Delta^{4,6}$-pregnadiene-3,20-dione*

Following the procedure of Example 12 but substituting 6β - bromo - 16α,17α - dimethylmethylenedioxy - 19-nor-progesterone for the 6β - chloro - 16α,17α - dimethylmethylenedioxy - 19 - nor - progesterone there is obtained 6 - bromo - 16α,17α - dimethylmethylenedioxy - 19 - nor-$\Delta^{4,6}$-pregnadiene-3,20-dione.

EXAMPLE 15

*6-chloro-19-nor-$\Delta^{4,6}$-pregnadiene-16α-17α-diol-3,20-dione (XI)*

A solution of 900 mg. of 6-chloro-16α,17α-dimethylmethylenedioxy-19-nor-$\Delta^{4,6}$-pregnadiene-3,20-dione in 15 ml. of 90% formic acid is heated at 42° for twenty-two hours. The solvents are removed in vacuo and the crude residue dissolved in 15 ml. of methanol and treated under nitrogen with stirring with 10 ml. of a 10% oxygen free solution of potassium carbonate in water. After thirteen minutes at room temperature, the mixture is neutralized with 1 ml. of glacial acetic aid and the solution concentrated in vacuo after the addition of water. Extraction with chloroform followed by drying over sodium sulfate and evaporation in vacuo furnishes a residue which on crystallization gives 6-chloro-19-nor-$\Delta^{4,6}$-pregnadiene-16α,17α-diol-3,20-dione.

EXAMPLE 16

*6- bromo-19-nor-$\Delta^{4,6}$-pregnadiene-16α,17α-diol-3,20-dione*

Following the procedure of Example 15 but substituting 6 - bromo - 16α,17α - dimethylmethylenedioxy - 19 - nor-$\Delta^{4,6}$-pregnadiene-3,20 - dione for 6 - chloro - 16α,17α - dimethylmethylenedioxy - 19 - nor - $\Delta^{4,6}$ - pregnadiene - 3,20-dione there is obtained 6-bromo-19-nor-$\Delta^{4,6}$-pregnadiene-16α,17α-diol-3,20-dione.

EXAMPLE 17

*6-chloro-16α,17α-(β-methyl-α-phenylmethylenedioxy)-19-nor-$\Delta^{4,6}$-pregnadiene-3,20-dione (VIII)*

A solution of 1 gm. of 6-chloro-19-nor-$\Delta^{4,6}$-pregnadiene-16α,17α-diol-3,20-dione in 15 ml. of freshly distilled acetophenone containing 0.25 ml. of 70% perchloric acid is allowed to remain at room temperature for two hours. The solution is washed, neutralized with 5% bicarbonate, diluted with water and extracted with chloroform. Chloroform was washed with water and then evaporated to dryness. Crystallization of the residue gives 6-chloro-16α,17α - (β - methyl - α - phenylmethylene - dioxy) - 19-nor-$\Delta^{4,6}$-pregnadiene-3,20-dione.

EXAMPLE 18

*6-chloro-16α,17-α-(β-methyl-α-phenylmethylenedioxy)-19-nor-$\Delta^{4,6}$-pregnadiene-3,20-dione*

Following the procedure of Example 12 but substituting 6β - chloro - 16α,17α - (β - methyl - α - phenylmethylenedioxy) - 19 - nor - progesterone for 6β - chloro - 16α, 19α - dimethylmethylenedioxy - 19 - nor - progesterone there is obtained 6 - chloro - 16α,17α - (β - methyl - α-phenylmethylenedioxy) - 19 - nor $\Delta^{4,6}$ - pregnadiene-3,20-dione.

EXAMPLE 19

*6-bromo-16α,17α-(β-methyl-α-phenylmethylenedioxy)-19-nor-$\Delta^{4,6}$-pregnadiene-3,20-dione*

Following the procedure of Example 17 but substituting 6 - bromo - 19 - nor - $\Delta^{4,6}$ - pregnadiene - 16α,17α-diol - 3,20 - dione for 6 - chloro - 19 - nor - $\Delta^{4,6}$-pregnadiene - 16α,17α - diol - 3,20 - dione there is obtained 6-bromo - 16α,17α - (β - methyl - α - phenylmethylenedioxy) - 19 - nor - $\Delta^{4,6}$ - pregnadiene - 3,20 - dione.

EXAMPLE 20

*6-bromo-16α,17α-(β-methyl-α-phenylmethylenedioxy)-19-nor-$\Delta^{4,6}$-pregnadiene-3,20-dione*

Following the procedure of Example 14 but substituting 6β - bromo - 16α,17α - (β - methyl - α - phenylmethylenedioxy) - 19 - nor- progesterone for 6β - bromo - 16α, 17α - dimethylmethylenedioxy - 19 - nor - progesterone there is obtained 6 - bromo - 16α,17α - (β - methyl - α-phenylmethylenedioxy) - 19 - nor - $\Delta^{4,6}$ - pregnadiene-3,20-dione.

The invention may be variously otherwise embodied within the scope of the appended claims.

What is claimed is:

1. A compound selected from the group consisting of steroids of the formula:

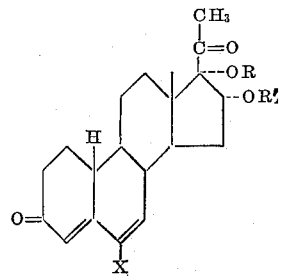

wherein X is selected from the group consisting of hydrogen, chlorine and bromine; each R and R′ is hydrogen; and when taken together R and R′ is

wherein P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of monocyclic cycloalkyl and monocyclic heterocyclic.

2. A compound of the formula:

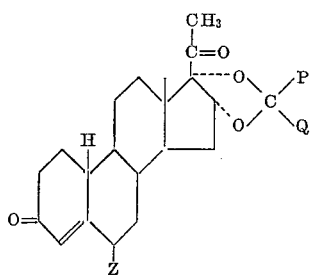

wherein Z is selected from the group consisting of chlorine and bromine; and P and Q are as defined in claim 1.

3. A compound of the formula:

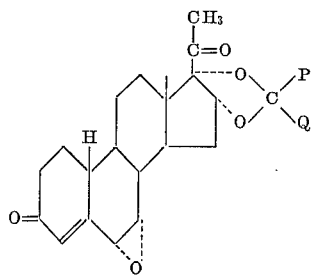

wherein P and Q are as defined in claim 1.

4. 6β-chloro-16α,17α-(β-methyl - α - phenylmethylenedioxy)-19-nor-progesterone.

5. 16α,17α-dimethylmethylenedioxy-19-nor-$\Delta^{4,6}$-pregnadiene-3,20-dione.

6. 16α,17α-(β-methyl-α - phenylmethylenedioxy) - 19-nor-$\Delta^{4,6}$-pregnadiene-3,20-dione.

7. 6α,7α-oxido-16α,17α - dimethylmethylenedioxy - 19-nor-progesterone.

8. 6-chloro-16α,17α-dimethylmethylenedioxy - 19 - nor-$\Delta^{4,6}$-pregnadiene-3,20-dione.

9. 6-bromo-16α,17α-dimethylmethylenedioxy-19 - nor-$\Delta^{4,6}$-pregnadiene-3,20-dione.

10. 6-chloro-16α,17α-(β-methyl - α - phenylmethylenedioxy)-19-nor-$\Delta^{4,6}$-pregnadiene-3,20-dione.

11. 6β-chloro-16α,17α-dimethylmethylenedioxy-19 - nor-progesterone.

References Cited by the Examiner
UNITED STATES PATENTS

| | | | |
|---|---|---|---|
| 3,049,540 | 8/1962 | Fried | 260—239.55 |
| 3,050,519 | 8/1962 | Fried | 260—239.55 |
| 3,123,601 | 3/1964 | Diassi | 260—239.55 |

LEWIS GOTTS, *Primary Examiner.*